United States Patent [19]

Moore et al.

[11] Patent Number: 4,799,106
[45] Date of Patent: Jan. 17, 1989

[54] CONTROLLING IMAGE SIGNALS IN AN IMAGING APPARATUS

[75] Inventors: William T. Moore, Buckhurst Hill; Kenneth J. Wallace, Woodford Green, both of United Kingdom

[73] Assignee: Rank Pullin Controls Limited, Loughton, England

[21] Appl. No.: 897,858

[22] Filed: Aug. 19, 1986

[30] Foreign Application Priority Data

Aug. 22, 1985 [GB] United Kingdom ............... 8521019

[51] Int. Cl.⁴ ..................... H04N 5/235; H04N 5/57
[52] U.S. Cl. ..................................... 358/168; 358/169; 358/164; 358/174
[58] Field of Search ............... 358/168, 169, 174, 177, 358/164, 166, 282; 382/51, 52

[56] References Cited

U.S. PATENT DOCUMENTS

| | | | |
|---|---|---|---|
| 3,621,129 | 11/1971 | Fisher . | |
| 3,800,078 | 3/1974 | Cochran et al. . | |
| 3,873,767 | 3/1975 | Okada et al. | 358/169 X |
| 3,914,545 | 10/1975 | Engel | 358/169 |
| 3,979,555 | 9/1976 | Opittek et al. . | |
| 3,983,320 | 9/1976 | Ketcham et al. . | |
| 3,984,631 | 10/1976 | Avicola . | |
| 3,996,421 | 12/1976 | Pruznick et al. . | |
| 4,090,217 | 5/1978 | Goyal et al. | 358/37 |
| 4,126,884 | 11/1978 | Shunley, II | 358/168 X |
| 4,135,200 | 1/1979 | Shanley, II | 358/168 X |
| 4,253,110 | 2/1981 | Harwood et al. | 358/169 X |
| 4,356,508 | 10/1982 | Okada | 358/168 X |
| 4,442,544 | 4/1984 | Moreland et al. | 382/53 |
| 4,450,482 | 5/1984 | Ackermann | 358/160 |
| 4,451,849 | 5/1984 | Fuhrer | 358/169 X |
| 4,489,349 | 12/1984 | Okada | 358/168 |
| 4,499,497 | 2/1985 | Levine | 358/213.15 |
| 4,682,231 | 7/1987 | Yamakawa | 358/168 |

FOREIGN PATENT DOCUMENTS

| | | |
|---|---|---|
| 0019518 | 5/1980 | European Pat. Off. . |
| 0078282 | 4/1982 | European Pat. Off. . |
| 0082318 | 11/1982 | European Pat. Off. . |
| 0113016 | 11/1983 | European Pat. Off. . |
| 538947 | 8/1941 | United Kingdom . |
| 904018 | 8/1962 | United Kingdom . |
| 1297060 | 11/1972 | United Kingdom . |
| 1504675 | 3/1978 | United Kingdom . |
| 1525532 | 9/1978 | United Kingdom . |
| 2006954 | 5/1979 | United Kingdom . |
| 2029666 | 3/1980 | United Kingdom . |
| 2129635 | 9/1980 | United Kingdom . |
| 2061660 | 5/1981 | United Kingdom ............... 358/169 |
| 2115256 | 9/1983 | United Kingdom . |
| 2112602 | 8/1985 | United Kingdom . |

OTHER PUBLICATIONS

Ketcham: "Real-Time Image Enhancement Techniques"; Feb. 26, 1976; Proc. Soc. Photo-Optical Instrumentation Eng.; pp. 120–125.

Frei: "Image Enhancement by Histogram Hyperbolization"; 1977; Comp. Graphics and Image Processing; vol. 6; pp. 286–294.

Hummel; "Image Enhancement by Histogram Transformation"; 1977; Comp. Graphics and Image Processing; vol. 6; pp. 184–195.

Ting et al; "Digital Processing Techniques for Encoding of Graphics"; Jul. 1980; Proc. IEEE; vol. 68; No. 7; pp. 757–769.

Primary Examiner—James J. Groody
Assistant Examiner—E. Anne Faris
Attorney, Agent, or Firm—Saidman, Sterne, Kessler & Goldstein

[57] ABSTRACT

Thermal imaging apparatus is provided with a comparator and a digital counter for counting the number of pixels in the scene within certain defined brightness bands. Utilizing this data, a microprocessor controls gain, level, gamma correction and integration for noise reduction.

18 Claims, 3 Drawing Sheets

CONTROLLING IMAGE SIGNALS IN AN IMAGING APPARATUS

BACKGROUND

This invention relates to imaging apparatus and is particularly applicable to thermal imaging apparatus.

Thermal imaging apparatus is known in which a thermal image of a scene is scanned across one or more thermal detectors to produce an image signal which is processed and applied to a display device, such as a CRT, which produces a visible image. The thermal contrast between different objects in the scene may be very low and accordingly careful signal processing is necessary in order to produce a visible image of good quality. Of particular importance is the achievement at all times of the optimum level (brightness) setting and the optimum gain (contrast) setting. Further, satisfactory achievement of noise reduction would be a considerable advantage.

PRIOR ART

UK Pat. No. 2129635 (EMI Limited) discloses an arrangement for control of level and gain settings in which histogram analysis of a digitized video signal is performed to determine the mean grey level of the signal and the dispersion of grey levels about the mean. Adjustments to the level and gain settings are then automatically performed in order to bring the determined mean grey level and dispersion towards manually input reference values. The problem with the apparatus disclosed by EMI is that complex hardware is required to determine the mean grey level and the dispersion in the video signal and a high quality picture can be reproduced only if the operator who selects the reference values is sufficiently experienced and skilled to be able to select the optium values needed as the scene changes. Thus, this prior art fails to provide truly automatic control of level and/or gain.

A further proposal has been made in Patent Application No. WO82/03959 (Ericsson) in which the number of pixels above and below high and low brightness thresholds respectively are calculated and, in response to the results of the calculation, both the thresholds and the gain applied to the video signal are adjusted. This proposal does not provide for any correction of brightness, but only contrast. Furthermore, it provides a feed forward technique in which no analysis of the corrected video signal is performed so that any errors in the correction itself go undetected. It is not clear from the disclosure that any improvement will in fact be achieved by the Ericsson proposal.

SUMMARY OF THE INVENTION

The problem underlying one aspect of the invention is to provide automatic level control.

In accordance with this aspect of the invention, there is provided imaging apparatus comprising:

means for producing electrical image signals representing the brightness of pixels in a scene;

means for controlling the level of said signals;

digital means for determining if there is a difference between the number of said pixels in a high brightness band and the number thereof in a low brightness band; and feedback means responsive to said difference for adjusting said level control means at least to reduce said difference.

The problem underlying a further aspect of the invention is to provide automatic gain control.

In accordance with this aspect of the invention, there is provided imaging apparatus comprising means for producing electrical image signals representing the brightness of pixels in a scene; digital means for calculating the proportion of the total number of pixels in the scene within an intermediate brightness band and to compare said calculated proportion with a predetermined proportion; and feedback means for reducing or increasing gain applied to said electrical image signals according to whether said calculated proportion is less or more than said predetermined proportion.

In a preferred embodiment, both the level control and gain control in accordance with these aspects of the invention are employed in the same apparatus.

In an alternative aspect, the present invention provides thermal imaging apparatus having means for digitally counting the number of pixels having a brightness level in each of a plurality of different ranges, signal processing means, and control means operable to control said signal processing means in dependance upon said count. The signal processing means may comprise a gain control means and/or a level control means and/or a gamma curve correction means and/or a noise reduction integrating means and/or a means for performing other functions.

In an alternative aspect, the invention provides imaging apparatus, preferably thermal imaging apparatus including a variable gain control circuit and a variable integration circuit for effecting noise reduction, wherein means is provided to adjust the integration circuit as a function of the gain control setting or vice versa.

In a further alternative aspect, the present invention provides imaging apparatus, preferably thermal imaging apparatus, including an adjustable gamma correction circuit and control means for said gamma correction circuit responsive to a parameter of the image.

The invention is described further by way of example with reference to the accompanying drawings, in which.

Figure 1:
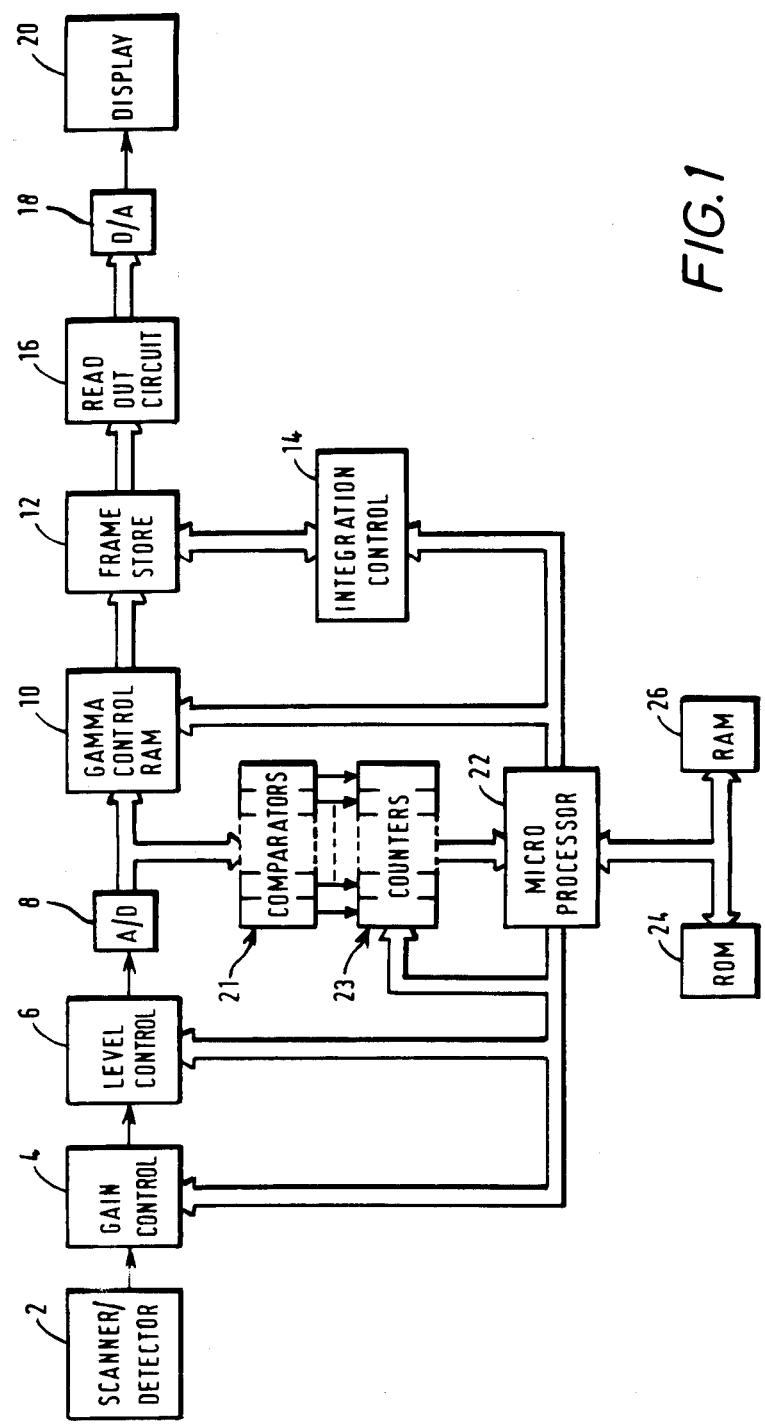
FIG. 1 is a block diagram of thermal imaging apparatus according to a preferred embodiment of the invention.

With reference to the drawings, thermal imaging apparatus comprises a thermal scanner 2 which includes one or more thermal detectors (not shown) which produce an analogue signal in one or more channels representing the thermal image. The analogue signal is applied through a gain control circuit 4 and a level control circuit 6 to an analogue to digital converter 8 which converts the analogue signal to digital form. The data output by the analogue to digital converter 8 consists of a stream of parallel binary numbers, which may for example be eight bit numbers, each corresponding to a pixel and each having a magnitude which represents the brightness of that pixel. The digital signals output by the analogue to digital converter 8 are supplied to a RAM 10 which effects gamma correction in a manner to be described. The digital signals output by the RAM 10 are supplied to a store 12 which is sufficient to contain the digital signals representing a complete frame. Integration of the signals stored in the frame store 12 is achieved by means of integration control circuit 14, the operation of which will be described in more detail below, for noise reduction, and the integrated digital signals are read from the frame store 12 by a read-out circuit 16. As is well known, certain types of thermal scanner, particularly those in which scanning of the thermal image is achieved by first and second coaxial polygonal reflectors, produce an image signal in which the scan lines are produced in a sequence different from that required by a display device such as a CRT. Accordingly, the read out circuit 16 may be effective to read the lines of image data from the frame store 12 in an order different from that in which they are input to the frame store 12 so that the signals read out after application to a digital to analogue converter 18, are in the order required for operation of a display device 20, such as a CRT.

The digital image data signals output by the A/D converter 8 are also applied to a plurality of comparators 21. A microprocessor 22, which is controlled by programs stored in a ROM 24, performs certain measurements on the image data with the aid of the comparators 21 and a plurality of counters 23 and then derives control data for supply to the gain control circuit 4, the level control circuit 6, the gamma correction RAM 10 and the integration control circuit 14. In this way, the gain, level, gamma correction and integration respectively are controlled in dependance upon measurements made by the comparators 21 and the microprocessor 22 and algorithms stored in the ROM 24.

Data Measurement

Each of the comparators 21 compares the magnitude of each number received from the A/D converter 8 with a respective different threshold and outputs a pulse to the corresponding one of the counters 23 for each number received from the converter 8 below the set threshold. Thus, the counters 23 count the number of pixels in each frame having a brightness level in a band less than the threshold set into the corresponding comparator 21. At the end of a frame, the microprocessor 22 transfers the numbers in the counters 23 to a RAM 26 and resets the counters 23 so that they may perform a new counting operation. Thus, there is stored in the RAM 26 data enabling the microprocessor to determine the number of pixels in the scene in each of a number of different brightness bands. By way of example, if the first threshold is 10% of the maximum brightness level and each subsequent threshold is 10% greater than the previous, the counter will count the number of pixels in the bands 0–10%, 0–20%, 0–30% etc. From this data, the computer may calculate the number of pixels in ten brightness bands, the first being brightness levels of 0–10%, the second 10–20% etc. and the tenth 90–100%.

Figure 2:
FIGS. 2 to 6 are histograms for illustrating the operation of the apparatus of FIG. 1.
Figure 3:
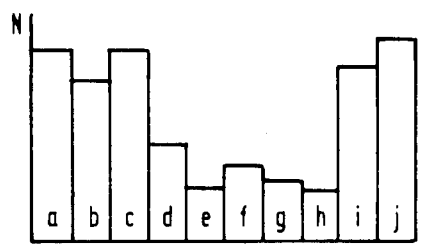
Figure 4:
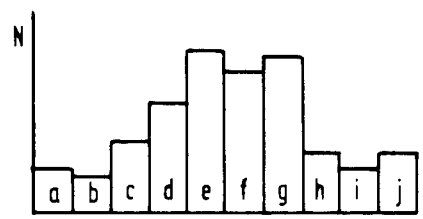
Figure 5:
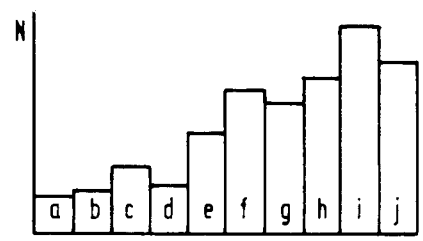

The number of pixels in each band may be represented as a histogram, as illustrated in FIGS. 2 to 6, each representing a different image. In these figures, the bars a–j represent the number N of pixels in each of the ten bands referred to by way of example, bar a representing the number of pixels of brightness 0–10%, bar b 10%–20% etc. Thus, in FIG. 2, there is a relatively even distribution of the number of pixels in each brightness band. In FIG. 3, the number of pixels having brightness in the mid levels (bands c–g) is relatively low, there being a greater number of pixels having high levels and low levels of brightness. In FIG. 4, the number of pixels having mid levels of brightness (bands d–g) is relatively high, there being relatively few pixels with low levels and high levels of brightness. In FIG. 5, the number of pixels with brightness levels in the higher ranges is greater than in the lower ranges and in FIG. 6 the number of pixels with brightness in the lower ranges is greater than that in the higher ranges.

Thus, the microprocessor 22 computes the numbers a–j represented in FIGS. 2 to 6 from the data received from the counter 23 and stored in the RAM 26. Computations are then performed on the numbers a–j by the microprocessor 22 in accordance with programs stored in ROM 24, to derive the required control data.

Level Control

Microprocessor 22 controls level control circuit 6 to achieve a condition in which the number of pixels having low brightness levels, for example in the range of 0–30%, is approximately equal to the number of pixels having brightness in the high levels, for example 70%–100%. Thus, in the embodiment under discussion, microprocessor performs the following calculations:

$$N1 = a + b + c$$

$$N2 = h + i + j$$

where N1 is the number of pixels having a brightness level in the range 0–30% and N2 is the number of pixels having a brightness level in the range 70%–100%.

The microprocessor then performs the following computation:

$$\frac{N2 - N1}{T}$$

where T is the total number of pixels in the frame.

If the result of this computation is zero, or within a certain tolerance thereof, level control is left unchanged. If the result of the computation is a positive number outside this tolerance the level control is increased by applying a command signal to the level control circuit 6 and if it is a negative number outside this tolerance, the level is reduced by applying an appropriate command signal to the level control circuit 6. In this embodiment of FIG. 1, it is assumed that digital control signals are fed back from the microprocessor to the level control circuit 6. As an alternative, the microprocessor could output a signal representing the difference N2−N1 to a digital to analogue converter the output of which may be used as a feedback control signal for the level control circuit 6. In the embodiment illustrated in the drawings, the level control circuit 6 is in the analgoue portion of the circuitry and thus provides a DC offset for the analogue video signal. Alternatively, it would be possible to perform level control digitally by providing means to add a digital value to each of the pixels, in the digital portion of the circuitry.

Although in the example described, level control has been performed by determining and equalizing the number of pixels in the spaced apart bands 0%–30% and 70%–100%, it would be possible to perform level control utilizing contiguous low and high bands for example 0–50% and 50%–100%.

Gain Control

Gain control is achieved by determining whether a predetermined proportion of the total number of pixels is within a selected intermediate brightness band or bands. In a specific example, the microprocessor will adjust the gain control circuit to reduce the gain if less than approximately nine tenths of the total number of pixels are within the brightness range 10%-90% and will increase the gain if more than approximately nine tenths of the total number of pixels are within the brightness range 30%-70%.

By way of more specific example, and assuming that the gain control circuit 4 is adjusted in steps in which the gain is changed by a factor of 2, the microprocessor performs the following algorithms:

1. Decrease gain by one step if:

$$\frac{b + c + \ldots + i}{T} \text{ is less than } \frac{87}{100}$$

and

2. Increase gain by one step if:

$$\frac{d + e + f + g}{T} \text{ is greater than } \frac{93}{100}$$

As will be appreciated, algorithm 1 above reduces the gain if less than 0.87 of the total number of pixels are within the brightness range 10-90% and algorithm 2 increases the gain if more than 0.93 of the total number of pixels are within the brightness range 30%-70%. The proportions 0.87 and 0.93 are selected for the two algorithms, rather than 0.9 (i.e. nine tenths as discussed above in general terms) to avoid hunting.

The above described method of gain and level control has the advantage, compared to known systems, that effects such as an extremely bright but small portion of the scene, due for example to a fire, will not cause the gain and level control settings for the entire frame to be set at a level determined mainly by the brightness of the fire. Prior art systems in which gain and level is determined by the magnitude of the brightest or least bright pixels suffer from this disadvantage so that the remainder of the scene is not reproduced with sufficient quality. With the present invention, the main part of the image will be of high quality, being reproduced with appropriate gain and level settings, despite the existence in the scene of an effect such as a bright spot or fire.

Preferably, the microprocessor includes in its programs instructions to ignore short term fluctuations in the results of the above computations, such as may be caused by transient effects, for example a sudden flash or a bird passing through the scene.

Gamma Correction

The histograms of FIGS. 2 to 6 show five typical conditions which may arise in a thermal image of a scene but which require different gamma corrections in order to produce a good quality visible image. In particular, good quality will be achieved if the number of pixels in each of the brightness bands in the reproduced image is similar.

Such a condition exists in the frame represented by the histogram of FIG. 2, which of course is derived from the thermal imager 2. Accordingly, essentially no gamma correction is necessary. The gamma correction RAM 10, therefore utilizes a straight line gamma curve as represented by curve I in FIG. 7 under conditions similar to those shown in FIG. 2.

Figure 6:
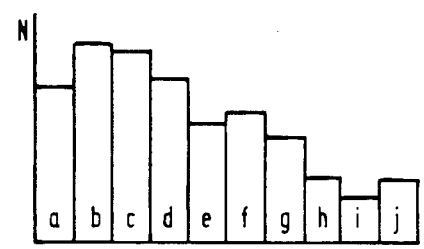
Figure 7:
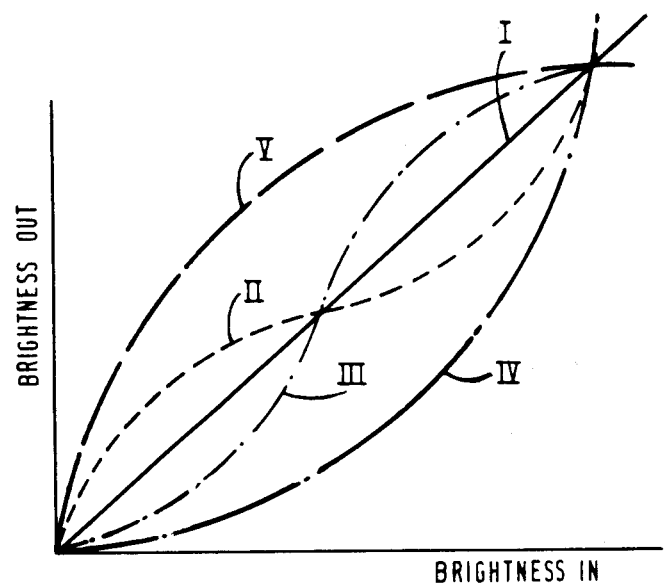
FIG. 7 is a graph showing gamma correction curves, for illustrating the operation of the apparatus of FIG. 1.

In the image whose histogram is shown in FIG. 3, a gamma correction according to curve II of FIG. 7 should be applied. Similarly, the images whose histograms are shown in FIGS. 4, 5 and 6 should be subjected to gamma corrections represented by the curves III, IV and V of FIG. 7.

The microprocessor 22 firstly determines the profile of the histogram and then supplies appropriate data representing the required gamma curve to RAM 10. Gamma correction is achieved by utilizing the data input from the A/D convertor 8 as address data for the RAM 10 so that the data output by the RAM 10, in response to each input binary number, is the data located in the address defined by that input binary number. In this way, the data in the RAM 10 defines the appropriate one of the curves I to V of FIG. 7. The microprocessor monitors the profile of the histogram derived from incoming frames and if the profile changes to an extent which requires a different gamma correction, the data representing the new gamma curve is loaded into RAM 10 in replacement for the data previously stored therein.

Further, it is possible for the microprocessor simply to instruct a change of slope of the gamma curve under certain conditions. For example, if it is determined by the microprocessor 22 that the ideal level of gain control would be achieved by changing the gain level by only half a step instead of a whole step, the required effect can be achieved by changing the slope of the gamma curve. For example, to reduce the effective gain level by half a step, the slope of the gamma curve would be reduced by an appropriate amount and to increase the effective gain level by half a step the gamma curve slope would be increased by an appropriate amount.

Noise Reduction

Integration circuit 14 causes the data stored in frame store 12 to have added thereto the data representing the incoming frame, this data coming from RAM 10, so as to perform integration to achieve noise reduction. This integration is discontinued in portions of the frame in which motion takes place or alternatively may be discontinued over the whole of the frame in the event that motion occurs in any part. Further, the number of frames added together, i.e. the number of integrations performed, is controlled in accordance with the level of gain control applied by gain control circuit 4.

Thus, to control integration control circuit 14, the microprocessor 22 detects the presence or absence of motion in the picture, in accordance with programs stored in ROM 24, by detecting the rate of change of brightness, from frame to frame, of one or more pixels, rapid changes in brightness of a given pixel indicating that motion is taking place in the portion of the frame of which that pixel forms a part. The threshold for this rate of change of brightness is varied by the microprocessor in dependance upon the setting of the gain control circuit 4, for example by means of a look-up table containing the appropriate threshold value for each of the possible settings of the gain control circuit. Thus, the microprocessor 22 stores the setting of the gain control circuit 4 in RAM 26 and obtains the required threshold value for motion detection from the aforementioned look-up table. When motion is detected, a command is output by the microprocessor 22 to the circuit 14 to discontinue integration either entirely or in the portion of the frame in which motion is taking place. Further, the circuit 14 is controlled by command signals from the microprocessor 22 to increase the number of integrations with increases in the level of gain applied by the circuit 4.

Various modifications are possible within the scope of the invention. For example, although the embodiment illustrated is controlled by a single microprocessor, it would be possible to employ more than one microprocessor. For example, the frame store may include an additional microprocessor in communication with the microprocessor 20. Hard wired logic could be employed for putting the invention into practice instead of microprocessors.

Although in the illustrated embodiment, the brightness of each of the pixels in the scene has been determined from the digitised signals output by the analogue to digital converter 8, it is possible within the scope of the invention to determine the brightness of the pixels from the analogue image signal, for example by applying this analogue signal to an analogue comparison circuit.

Although the gain control circuit 4 has been described as being adjustable in steps, it is also possible to employ a gain control circuit which is continuously adjustable. Also, although only five gamma curves have been illustrated in FIG. 7, a larger or smaller number than this may be employed and, for example, provision may be made for providing a continuous (i.e. non stepwise) variation in the shape of any particular one or more of the curves.

Although in the examples described with reference to the drawings, it has been indicated that the microprocessor 22 computes the numbers a–j illustrated in the histograms of FIGS. 2 to 6, it is not essential that these numbers be computed. For example, the microprocessor 22 could derive the required control signals by performing computations directly on the numbers supplied by the counter 23.

Accordingly, whilst the histographic representation of FIGS. 2 to 6 is a convenient aid to understanding the invention, it is not essential that the numbers depicted in these histograms actually be computed and stored in the performance of the invention.

Further, it is possible within the scope of the invention to provide for the insertion into the reproduced image of a graticule, whose position in the image may be varied. A preferred method of producing such a graticule, in accordance with the invention, is to provide means for inverting one of the more significant bits of the digital signals representing those pixels which coincide with portions of the graticule. Thus, an appropriate circuit may be inserted at a point between the A/D converter 8 and the D/A converter 18, such circuit being controlled by the microprocessor to perform an inversion on one of the most significant bits of the image data at appropriate instants. The timing of the bit inversion may be achieved by one or more pixel counters reset at the beginning of each line and controlled, by the microprocessor, to count up to the required number and then effect the aforesaid bit inversion thereby producing the graticule in the required position. The position of the graticule may be varied by varying the count made by these counters.

Although in the illustrated embodiment, pixels have been counted from an entire frame it would be possible to effect control of the image on the basis of pixel data from just a portion of the frame, for example just a central portion, in which case the microprocessor 22 would be programmed to cause the comparator 21 and counter 23 to respond to pixels just from the selected area.

It should be understood that the numerical data given above and the histograms and curves illustrated in FIGS. 2 to 7 are all given only by way of example and that accordingly variations may be made within the scope of the inventions.

We claim:

1. Imaging apparatus comprising:
   means for producing electrical image signals of a given level representing a brightness for each of a number of pixels in a scene;
   means for controlling the level of said signals;
   digital means for determining if there is a difference between the number of said pixels in a high brightness band and the number thereof in a low brightness band; and
   feedback means responsive to said difference for adjusting said level control means at least to reduce said difference.

2. Apparatus according to claim 1, wherein said means for producing electrical image signals includes analogue circuitry in which said electrical image signals are provided in analogue form and wherein said level control means includes an analogue DC offset circuit operable to apply an analogue DC offset to the electrical image signals.

3. Apparatus according to claim 1, wherein said high brightness band is spaced from said low brightness band.

4. Apparatus according to claim 1, wherein said high brightness band is contiguous with said low brightness band.

5. Apparatus according to claim 1, including:
   gain adjusting means;
   means for determining whether a predetermined proportion of the number of pixels in said scene is within a predetermined intermediate brightness band; and
   further feedback means controlling said gain adjusting means in dependence thereon.

6. Apparatus according to claim 5, wherein said further feedback means is operative to reduce the gain provided by said gain adjusting means if there is less than a first predetermined proportion of the total number of pixels within a first relatively wide intermediate brightness band and to increase the gain if there is more than a second predetermined proportion of the total number of pixels within a second relatively narrow intermediate brightness band.

7. Apparatus according to claim 6, wherein said first predetermined proportion is the same as said second predetermined proportion.

8. Apparatus according to claim 6, wherein said first predetermined proportion is less than said second predetermined proportion.

9. Apparatus according to claim 5, wherein said means for producing electrical image signals includes analogue circuitry in which said electrical image signals are provided in analogue form and wherein said gain adjusting means comprises an analogue gain control circuit operable to adjust the gain applied to said electrical image signals in analogue form.

10. Apparatus according to claim 1, including integration means for integrating a plurality of frames.

11. Apparatus according to claim 10, including gain adjusting means for adjusting the gain applied to said electrical image signals, said integration means being operable to perform said integration to an increasing extent with increase in said gain.

12. Apparatus according to claim 11, wherein said integration means is digital.

13. Apparatus according to claim 12, wherein said integration means comprises a frame store for storing data representing pixels in a complete frame.

14. Apparatus according to any of claim 12, including motion detector means for discontinuing said integration in response to motion in said scene.

15. Apparatus according to claim 14, including means for adjusting a motion detecting threshold in dependenance upon the setting of the gain adjusting means.

16. Imaging apparatus comprising means for producing electrical image signals representing a brightness for each of a number of pixels in a scene; digital means for calculating a proportion which equals the number of pixels in said scene determined to be within an intermediate brightness band divided by the number of pixels determined to be in said scene and to compare said calculated proportion with a predetermined proportion; and
feedback means for reducing or increasing gain applied to said electrical image signals according to whether said calculated proportion is less or more than said predetermined proportion.

17. Imaging apparatus comprising:
means for producing electrical image signals representing a brightness for each of a number of pixels in a scene;
digital means operative to determine the number of said pixels in a first relatively wide intermediate brightness band and in a second relatively narrow intermediate brightness band;
gain adjusting means for said electrical image signals; and
control means controlling said gain adjusting means in response to said digital means to reduce the gain if there is less than a first predetermined proportion of the total number of pixels within said first band and to increase the gain if there is more than a second predetermined proportion of the total number of pixels in the second band.

18. Imaging apparatus comprising:
means for producing electrical image signals representing a brightness for each of a number of pixels in a scene, said signals being produced in a succession of frames;
gain adjusting means for adjusting the gain applied to said electrical image signals;
digital integration means for noise reduction, said digital integration means being operable to integrate said image signals over a plurality of said frames by adding the signals representing corresponding pixels in each frame of said plurality; and
means for increasing and decreasing the number of frames in said plurality with increase and decrease of said gain,
whereby when said gain is increased, said number of frames over which said integration occurs is increased and when said gain is decreased, said number of frames over which said integration occurs is decreased.

* * * * *